US009380141B2

(12) United States Patent
Choi (10) Patent No.: US 9,380,141 B2
(45) Date of Patent: Jun. 28, 2016

(54) METHOD FOR SETTING CHARACTERISTIC OF ACCESSORY AND ACCESSORY OPERATION SYSTEM SUPPORTING THE SAME

(75) Inventor: Song Hwa Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 13/473,919

(22) Filed: May 17, 2012

(65) Prior Publication Data
US 2012/0317314 A1    Dec. 13, 2012

(30) Foreign Application Priority Data

Jun. 8, 2011 (KR) .................... 10-2011-0055157

(51) Int. Cl.
*H04M 1/00* (2006.01)
*H04M 1/60* (2006.01)
*H04M 1/725* (2006.01)

(52) U.S. Cl.
CPC ........ *H04M 1/6058* (2013.01); *H04M 1/72527* (2013.01)

(58) Field of Classification Search
CPC .. G06F 13/385; G06F 13/387; H04M 1/6058; H04M 1/72527
USPC ...................................... 710/8, 11
See application file for complete search history.

(56) References Cited

U.S. PATENT DOCUMENTS

| 7,836,216 B2 * | 11/2010 | Kashi et al. ..................... 710/15 |
| 8,554,924 B2 * | 10/2013 | Holden et al. ................ 709/227 |
| 2004/0259435 A1 | 12/2004 | Stephan et al. |
| 2008/0244119 A1 * | 10/2008 | Tokuhara ........... H04N 21/4126 710/58 |
| 2010/0069114 A1 * | 3/2010 | Lee ........................ H04M 1/585 455/556.1 |
| 2010/0075604 A1 * | 3/2010 | Lydon et al. ................. 455/41.3 |
| 2012/0124244 A1 * | 5/2012 | Yew .................................. 710/7 |

FOREIGN PATENT DOCUMENTS

WO      2004/001552 A2    12/2003

* cited by examiner

*Primary Examiner* — Ernest Unelus
(74) *Attorney, Agent, or Firm* — Jefferson IP Law, LLP (57) ABSTRACT

An accessory operation system for supporting setting of a characteristic of an accessory is provided. The accessory operation system includes the accessory configured to generate at least one input signal to be transmitted to a portable terminal and the portable terminal configured to store an accessory characteristic setting table which defines the at least one input signal transmitted from the accessory and a function to be performed based on the at least one input signal and configured to define at least one function which is associated with an electrical characteristic of a corresponding input signal of the at least one input signal transmitted from the accessory so as to newly set or update the accessory characteristic setting table.

19 Claims, 5 Drawing Sheets

METHOD FOR SETTING CHARACTERISTIC OF ACCESSORY AND ACCESSORY OPERATION SYSTEM SUPPORTING THE SAME

PRIORITY

This application claims the benefit under 35 U.S.C. §119(a) of a Korean patent application filed on Jun. 8, 2011 in the Korean Intellectual Property Office and assigned Serial No. 10-2011-0055157, the entire disclosure of which is hereby incorporated by reference.

BACKGROUND OF THE INVENTION

1. Field of the Invention

The present invention relates to a portable terminal. More particularly, the present invention relates to a method of discretionarily setting a characteristic of an accessory connected to a portable terminal and an accessory operation system supporting the same.

2. Description of the Related Art

Due to rapid technological development, a portable terminal has various functions. For example, in addition to a simple voice call function and a short message transmission function, the portable terminal has functions such as a video call, an electronic organizer function, an interne function, and the like. The portable terminal basically supports, for example, a voice collection function, an audio output function, and a screen display function in order to support a call function. Particularly, a conventional portable terminal provides an audio output conversion function included in the audio output function to provide an audio output to an earphone in addition to a speaker.

The earphone that is used in a conventional portable terminal includes earphones having a different number and/or configuration of poles. For example, a portable terminal may include a three pole earphone or a four pole earphone. Earphones having the same number of poles may have a different pole placement or configuration depending on a region in which the earphone is distributed. For example, earphones may have an American configuration or an European configuration. In the earphones manufactured as such, devices used for manufacturing the earphones may have different characteristics, or the earphones may have different characteristics according to respective specifications of earphone manufacturers.

Meanwhile, the conventional portable terminal detects an insertion of the earphone thereto by identifying an interrupt that is generated when the earphone is inserted to the portable terminal and supports an earphone function accordingly. In this process, the conventional portable terminal examines and compares an electrical characteristic of a particular input signal generated in the earphone with a preset value to determine which input signal is generated in the earphone. However, as described above, because the earphone has a different characteristic depending on each manufacturer or product, the portable terminal may not recognize an input signal from a certain earphone even when the earphone has a similar type and the same number of poles with respect to an earphone specified for the portable terminal. Thus, a user needs to purchase a specific earphone that matches with the portable terminal of the user, which causes inconvenience in searching for the specific earphone. Also, purchase choices are limited so that requirements for a product need are increased. Also, even when the user purchases the specific earphone, if an electrical characteristic of the corresponding earphone is in a range not recognized by the portable terminal, poor earphone recognition may occur, and thus, a proper solution to the problems is needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the abovementioned problems and/or disadvantages and to provide at least the advantages described below. Accordingly, an aspect of the present invention is to provide a method of supporting setting of a characteristic of an accessory such that various accessories may be operated in a portable terminal regardless of a characteristic and a type of the accessories, thereby eliminating user inconvenience and satisfying user needs and an accessory operation system supporting the same.

In accordance with an aspect of the present invention, a method of setting a characteristic of an accessory is provided. The method includes inserting the accessory to an accessory interface of a portable terminal, collecting an input signal generated in the inserted accessory, and performing a mapping operation in which the collected input signal is mapped to an auxiliary function item of a corresponding accessory.

In accordance with another aspect of the present invention, an accessory operation system for supporting setting of a characteristic of an accessory is provided. The accessory operation system includes the accessory configured to generate at least one input signal to be transmitted to a portable terminal, and the portable terminal configured to store an accessory characteristic setting table which defines the at least one input signal transmitted from the accessory and a function to be performed based on the at least one input signal and configured to define at least one function which is associated with an electrical characteristic of a corresponding input signal of the at least one input signal transmitted from the accessory so as to newly set or update the accessory characteristic setting table.

In accordance with another aspect of the present invention, a non-transitory computer-readable storage medium storing a program for setting a characteristic of an accessory is provided. The computer readable storage medium stores a program comprising instructions to cause a processor to: collect an input signal generated by an accessory that is operatively connected to a portable terminal, perform a mapping operation in which the collected input signal is mapped to an auxiliary function item of a corresponding accessory.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an accessory setting function an exemplary embodiment of the present invention will be described with respect to an earphone as a representative example for an operation method of an accessory of an exemplary embodiment of the present invention. However, the accessory of an exemplary embodiment of the present invention is not limited to the earphone but may include various kinds of external devices that can be connected to a portable terminal. In addition, in the following description, the earphone is described to have a key button provided thereon; however, the various exemplary embodiments of the present invention are not limited thereto. Namely, if a touch pad is provided on the earphone, the accessory may transmits an input signal generated on the touch pad to the portable terminal, and the portable terminal identifies an input signal transmitted from the accessory to support to update an accessory characteristic setting table or write a new accessory characteristic setting table based on a corresponding input signal. To this end, the accessory may include a generation means for generating an input signal corresponding to a function item of the accessory characteristic setting table stored in the portable terminal. For example, the generation means includes the key button or the touch pad, as described above. It should be understood that exemplary embodiments of the present invention are not limited by a type or a form of the accessory, but rather, exemplary embodiments of the present invention support setting an input signal generated in the accessory as a particular function of the accessory according to a user request.

Figure 1:
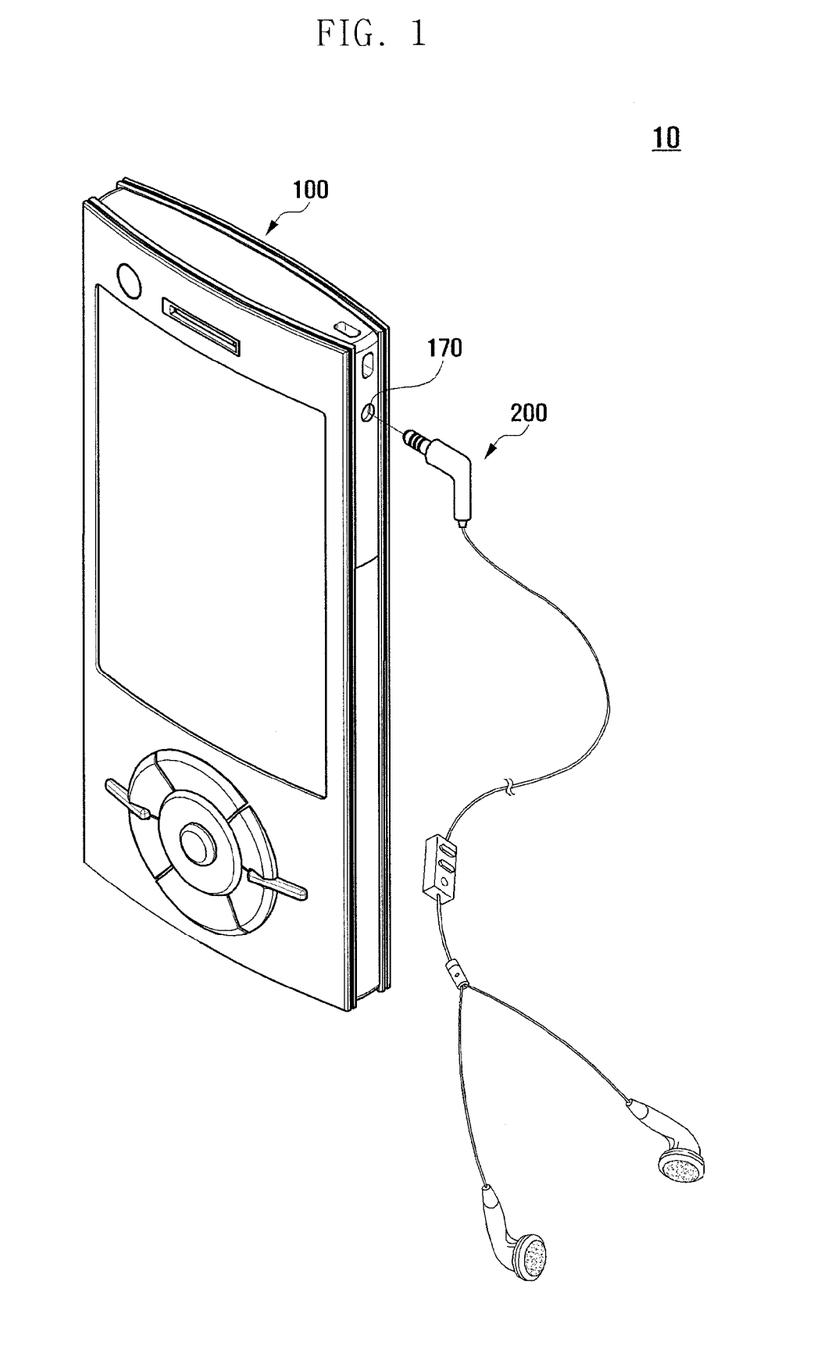
FIG. 1 is a schematic view illustrating a configuration of an accessory operation system according to an exemplary embodiment of the present invention.

FIG. 1 is a schematic view illustrating a configuration of an accessory operation system according to an exemplary embodiment of the present invention. Hereinafter, an earphone is described as a representative example of an accessory, and thus, the accessory operation system is referred to as an earphone operation system.

Referring to FIG. 1, an earphone operation system 10 according to the present invention includes a portable terminal 100 and an accessory, for example, an earphone 200 that is attachable/detachable to/from the portable terminal 100.

The earphone 200 can be inserted or removed from an accessory interface, for example, the earphone interface 170 provided on the portable terminal 100. As an example, the earphone interface 170 of the portable terminal 100 can be manufactured in a 3.5-pie type. The earphone interface 170 is manufactured in a structure such that the earphone 200 can be inserted thereto, and may have various configurations. For example, the earphone may have a 3-pole configuration or a 4-pole configuration. The earphone 200 can transmit various input signals to the portable terminal 100 depending on user control when the earphone 200 is inserted to the earphone interface 170. For example, the earphone 200, when inserted into the earphone interface 170, may generate a microphone (MIC) activation input signal, a volume up signal, a volume down signal, a call connection input signal, or a call termination input signal according to the user control. To this end, the earphone 200 may have a key button for generating respective input signals. When a specific key button is activated in the earphone 200, a signal corresponding to the specific key button can be transmitted to the portable terminal 100 through the earphone interface 170. As an example, when a specific key button is activated in the earphone 200, a voltage signal corresponding to the specific key button may be transmitted to the portable terminal 100 through the earphone interface 170. Here, the input signals described above may have the same or different characteristics. For example, the MIC activation input signal, the call connection input signal, the call termination input signal may be signals generated by an identical key button and may serve as an input signal of a function corresponding to an input order or a user function of the portable terminal 100 being activated at an input timing thereof.

Meanwhile, the portable terminal 100 may support the user function according to the input signal transmitted through the earphone interface 170. For example, when a file reproducing function is currently operated and the earphone interface 170 receives the volume up input signal or the volume down input signal from the earphone 200, the portable terminal 100 may control a volume of an audio signal outputted to the earphone 200 to increase or decrease according to a corresponding input signal. In addition, when the call connection input signal is received through the earphone interface 170 during when a call function is operated, the portable terminal 100 may control to perform a call connection and to support the call function based on an audio path including the earphone 200.

According to exemplary embodiments of the present invention, the portable terminal 100 supports setting of a characteristic of the earphone 200 inserted to the earphone interface 170 according to the user control. For example, the portable terminal 100 supports setting of the characteristic of the earphone 200 in which signals received from various key buttons provided on the earphone 200 are matched to a particular earphone function provided by the portable terminal 100. Accordingly, the earphone 200 may be operated based on earphone characteristic setting environment set by the user. To this end, the portable terminal 100 may provide, for example, a menu for setting the characteristic of the earphone 200 or a screen interface for setting the characteristic of the earphone 200.

Figure 2:
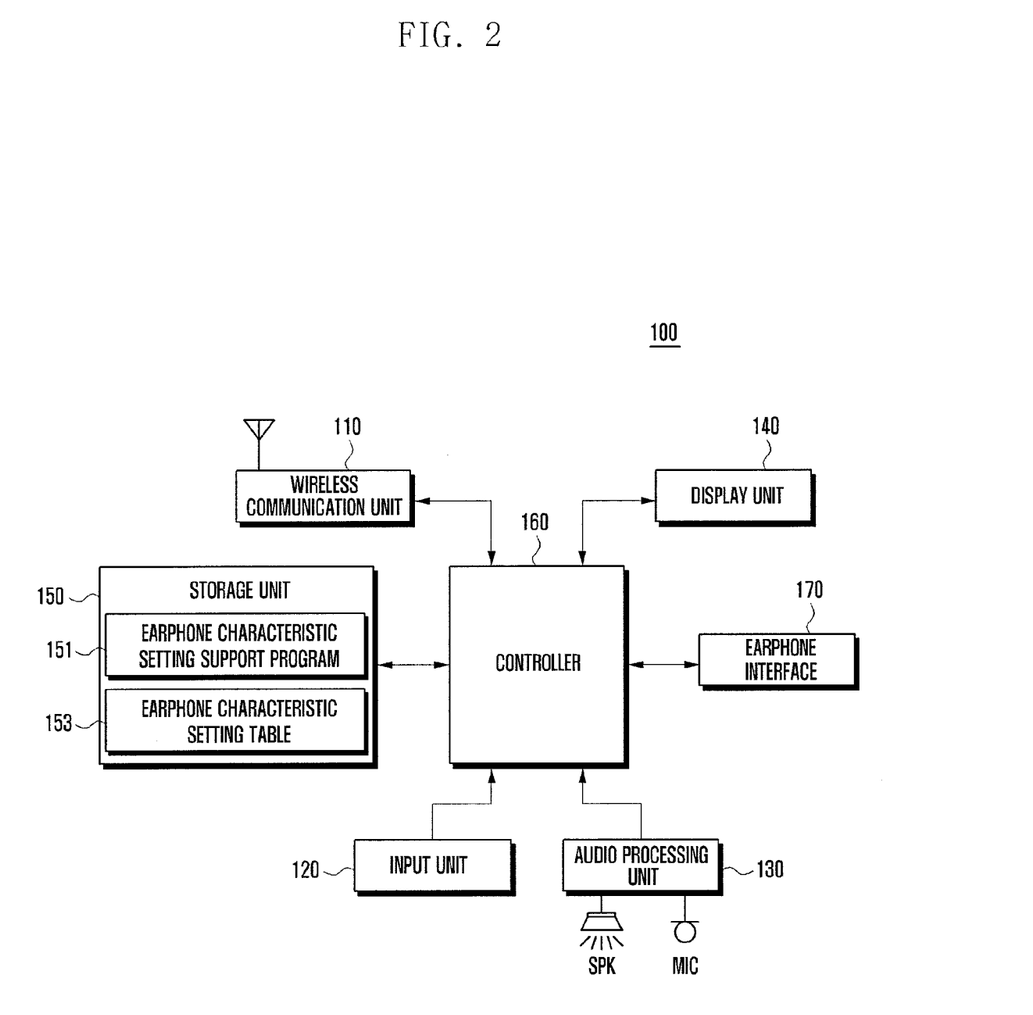
FIG. 2 is a block diagram illustrating a detailed configuration of a portable terminal according to an exemplary embodiment of the present invention.

FIG. 2 is a block diagram illustrating a detailed configuration of a portable terminal according to an exemplary embodiment of the present invention.

Referring to FIG. 2, a portable terminal 100 may have a configuration including a wireless communication unit 110, an input unit 120, an audio processing unit 130, a display unit 140, a storage unit 150, an earphone interface 170 and a controller 160.

The portable terminal 100 having the above configuration according to exemplary embodiments of the present invention may store an earphone characteristic setting support program 151 for operating an earphone function of the portable terminal 100 in the storage unit 150, and for supporting for an earphone characteristic setting function by loading a corresponding program to the controller 160 according to a user request. In order to set the characteristic of the earphone 200, the earphone 200 may be coupled to the earphone interface 170, and the portable terminal 100 may output setting guidance information for selecting and setting various input signals received from the earphone 200 to at least one of the display unit 140 and the audio processing unit 130. Hereinafter, each element of the portable terminal 100 will be described in detail with respect to a role and a function in relation to the earphone characteristic setting function.

The wireless communication unit 110, under control of the controller 160, forms a communication channel for a voice call, a communication channel for a video call, and a communication channel for data transmission, such as a video or a message. In other words, the wireless communication unit 110 forms a voice call channel, a data communication channel, and a video call channel between mobile communication systems. To this end, the wireless communication unit 110 may include a radio frequency transmission unit for performing a frequency up conversion and an amplification of a transmission signal and a radio frequency receiving unit for performing a low noise amplification and a frequency down conversion on a received signal. Particularly, the wireless communication unit 110 supports transmission and reception of the audio signal to enable reception and output of the audio signal during when operating the call function is operated. The audio signal received by the wireless communication unit 110 may be outputted through the earphone 200 connected to the earphone interface 170. In addition, the audio signal collected through the earphone interface 170 may be transmitted to another terminal through the wireless communication unit 110. As an example, a call connection request signal received through the wireless communication unit 110 may be transmitted to the earphone 200 through the earphone interface 170. In this case, when an input signal corresponding to call connection allowance is generated in the earphone 200, the portable terminal 100 can perform the call connection. The input signal corresponding to call connection allowance can be set according to a user setting. For example, a user may define the characteristics of the input signal corresponding to call connection allowance. Namely, the characteristics of the input signal corresponding to call connection allowance may include a defined user input corresponding to a call connection allowance.

The input unit 120 includes a plurality of input keys and function keys for receiving number or character information and setting various functions. The function keys may include an arrow key, a side key, and/or a shortcut key that is configured to perform a particular function. In addition, the input unit 120 generates and transmits a key signal entered in association with the user setting and a function control of the portable terminal 100 to the controller 160. Particularly, the input unit 120, according to the user control, may generate an input signal for setting an earphone characteristic such as, for example, an input signal for calling a screen interface for setting the earphone characteristic or an input signal required to define a characteristic of each key button provided on the earphone 200 with the screen interface being outputted. Here, the earphone characteristic setting function is a function to set an input signal generated from the key button provided on the earphone 200 such as, for example, the MIC input signal of the earphone 200 or the volume up/down input signals of the earphone 200. Namely, the earphone characteristic setting function is a function to define a key button provided on the earphone 200 and has a particular function as a corresponding function matched thereto in the portable terminal 100. The input signal generated by the input unit 120 may be transmitted to the controller 160 and the controller 160 may control a support for the earphone characteristic setting function according to the input signal received from the input unit 120.

The audio processing unit 130 includes a speaker (SPK) for reproducing an audio data. As an example, the audio data may be data that is transmitted and received during the video call or the voice call, or an audio data of a music file, a video file, and the like. The audio processing unit 130 also includes a microphone (MIC) for collecting a user's voice or other audio signal during the video call. As an example, the audio processing unit 130 may output an alarm sound for notifying a connection state when the earphone 200 is connected to the earphone interface 170. Also, the audio processing unit 130 may output an announcement sound for announcing characteristic setting of each key button included in the earphone 200 when operating the earphone characteristic setting function. When the earphone 200 is inserted to the earphone interface 170, the audio processing unit 130 supports to switch a signal path between the speaker (SPK) and the microphone (MIC) which are disposed on the portable terminal 100 to a signal path between an earphone speaker and an earphone microphone provided on the earphone 200.

The display unit 140 displays various menus of the portable terminal 100 as well as information entered by the user or information provided to the user. Namely, the display unit 140 may provide various screens according to the use of the portable terminal 100. For example, the display unit 140 may provide a standby screen, a menu screen, a message writing screen, a dialing screen, a portable terminal exit screen, a portable terminal boot screen, or the like. The display unit 140 may be implemented as a flat display panel such as a Liquid Crystal Display (LCD), an Organic Light Emitted Diode (OLED), or the like. The display unit 140, depending on a manufacturing design, may have a structure that includes a display panel and a touch panel.

Meanwhile, the display unit 140 according to exemplary embodiments of the present invention may output a screen including, for example, an image or an icon indicating a connection state of the earphone 200, an image or icon indicating a type of the earphone 200, or an image or an icon indicating compatibility of the earphone 200. Also, the display unit 140 according to exemplary embodiments of the present invention may output, selectively or automatically, a screen interface for supporting the earphone characteristic setting function according to the user request, or a type and a characteristic of the earphone 200. A screen interface associated with the earphone characteristic setting function will be described in detail with reference to the drawings described below.

The storage unit 150 may include a screen image to be outputted to the display unit 140 as well as an application program required for operating a function according to an exemplary embodiment of the present invention. When the display unit 140 is implemented as a touch screen, the storage unit 150 may include a key map or a menu map for operating the touch screen. As an example, the key map or the menu map may have various forms. Namely, the keymap may be a keyboard map, a 3*4 key map, a QWERTY key, a control map for controlling an operation of an application program that is currently activated, or the like. Also, the menu map may be a menu map for controlling the operation of the application program that is currently activated. According to exemplary embodiments of the present invention, the storage unit 160 may include a data area and a program area.

The program area may be used to store an operation system (OS) for booting the portable terminal 100 and for operating each of the above described elements and various application programs. For example, the operating system may be configured for operating an application program for supporting the call function of the portable terminal 100, a web browser for connecting to an interne server, an MP3 application program for reproducing various sound sources, an image outputting application program for reproducing, for example, pictures, or a video reproducing application program for reproducing video. Particularly, the program area according to exemplary embodiments the present invention may be used to store an accessory characteristic setting support program. The accessory characteristic setting support program may include an earphone characteristic setting support program 151 in regard to the earphone. Accordingly, the storage unit 150 may include an accessory characteristic setting table for supporting setting of an accessory characteristic, and the accessory characteristic setting table may include an earphone characteristic setting table 153 for supporting setting of the earphone characteristic.

The earphone characteristic setting support program 151 may be selectively or automatically activated according to the user request or a compatibility characteristic between the earphone 200 and the portable terminal 100. The earphone characteristic setting support program 151 may include a routine for determining whether the earphone 200 is connected to the earphone interface 170, a routine for collecting an input signal generated in the earphone 200 when the earphone 200 is connected to the earphone interface 170, a routine for comparing the collected input signal with a pre-defined setting value, and a routine for calling the screen interface for setting the earphone characteristic according to the comparison result or the input signal received from the input unit 120. Also, the earphone characteristic setting support program 151 may include a routine for writing a new earphone characteristic setting table 153 based on the input signal collected by the earphone 200 when the earphone characteristic setting function is activated, and/or a routine for transmitting the input signal received from the earphone 200 to the controller 160 to support a function in accordance with the connection to the earphone 200.

The data area is an area in which a data generated according to the use of the portable terminal 100 is stored. In the data area, a phonebook data or at least one icon and various contents according to a widget function can be stored. Particularly, the data area may be used to store the earphone characteristic setting table 153 for supporting the earphone 200. The earphone characteristic setting table 153 may include a value that defines an electrical signal of key buttons provided on the earphone 200. For example, the earphone characteristic setting table 153 may include information of a unique electrical characteristic of each key button provided on the earphone 200 such as, for example, a voltage signal generated when a MIC key button provided on the earphone 200 is pressed, a voltage signal generated when the volume up/down key button provided on the earphone 200 is pressed, a voltage signal generated when a key button provided for call connection or call termination is pressed, or the like. The controller 160 refers to the earphone characteristic setting table 153 stored in the data area to identify a type of the input signal transmitted from the earphone 200 and supports to perform a user function in accordance with a corresponding input signal.

The earphone interface 170 is an interface to which the earphone 200 is connected. The earphones interface 170 can be varied according to a type and a form of the earphone 200 that is connected thereto. For example, the earphone interface 170 can be provided in a 3.5 pie connector configuration to enable a 3.5 pie earphone 200 to be connected thereto. Also, the earphone interface 170 can be provided in a form such that a pin type earphone 200 can be connected thereto. The earphone interface 170 described above may include a plurality of electrodes and a ground electrode to support, for example, a three pole earphone or a four pole earphone. The earphone interface 170 transmits the input signal generated in the earphone 200 to the controller 160 or the audio processing unit 130, and transmits a signal generated in the controller 160 or processed by the audio processing signal 130 to the earphone 200.

The controller 160 supports an initialization process of each element by controlling a power supply to the each element of the portable terminal 100. Also, the controller 160 may perform various screen support and signal processing to control an earphone characteristic setting according to an exemplary embodiment of the present invention. To this end, the controller 160 may have a configuration as illustrated in the FIG. 3.

Figure 3:
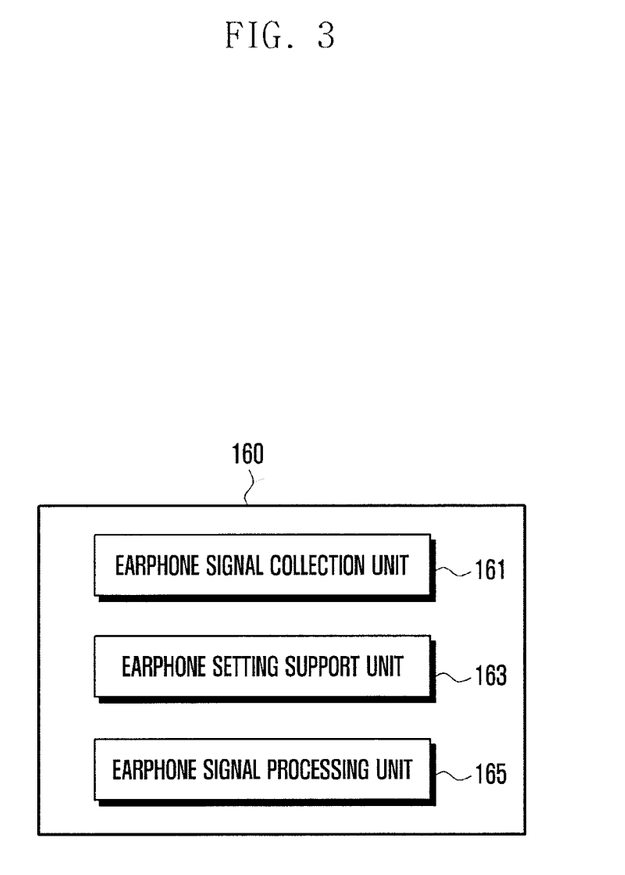
FIG. 3 is a view illustrating a detailed configuration of a controller of a portable terminal, such as, for example, the portable terminal illustrated in FIG. 2, according to an exemplary embodiment of the present invention.

FIG. 3 is a view illustrating a detailed configuration of a controller of a portable terminal, such as, for example, the portable terminal illustrated in FIG. 2, according to an exemplary embodiment of the present invention.

Referring to FIG. 3, a controller 160 according to an exemplary embodiment of the present invention may include an earphone signal collection unit 161, an earphone setting support unit 163, and an earphone signal processing unit 165. Here, an exemplary embodiment of the present invention is a technique that applies to an accessory. Although the controller 160 is described to include elements related to the earphone, exemplary embodiments of the present invention are not limited thereto. Namely, the earphone signal collection unit may be referred to as an accessory signal collection unit, the earphone setting support unit may be referred to as an accessory setting support unit, and the earphone signal processing unit may be referred to as an accessory signal processing unit. Also, each element may support controlling and signal processing for accessory characteristics setting and operation thereof. Hereinafter, the accessory is described as an earphone for illustrative purposes.

The earphone signal collection unit 161 collects an event generated in the earphone interface 170 and collects an earphone signal transmitted through the earphone interface 170. Particularly, the earphone signal collection unit 161 may collect an event that is generated when the earphone 200 is connected to the earphone interface 170 and may determine a connection state of the earphone 200 based thereon. Also, the earphone signal collection unit 161 may transmit a key button signal generated in the earphone 200 that is connected to the earphone interface 170 to the earphone signal processing unit 165. For example, when the earphone characteristic setting function of the present invention is activated, the earphone signal collection unit 161 may transmit a signal collected from the earphone 200 to the earphone setting support unit 163.

The earphone setting support unit 163 is configured to support setting of the key button signal of the earphone 200 transmitted from the earphone signal collection unit 161 as a particular function required for operating the earphone 200. To this end, the earphone setting support unit 163 may compare a particular key button signal of the earphone 200 among signals transmitted from the earphone signal collection unit 161 with the predefined setting value stored in the storage unit 150. The setting value is information stored in the earphone characteristic setting table 153, and the earphone setting support unit 163 may call the earphone characteristic setting table 153 to obtain the setting value. If it is determined, based on a comparison result, that the particular key button signal is different from the predefined setting value or out of an acceptable range, then the earphone setting support unit 163 may automatically activate the earphone characteristic setting function or control to output a popup window to inquire whether the user wants to activate a corresponding function. To support the earphone characteristic setting function, the earphone setting support unit 163 may support to output the screen interface, which will be described below, and may support to update the earphone characteristic setting table 153 by mapping the input signal received from the earphone 200 to a particular function key of the earphone 200. As an example, the earphone setting support unit 163 may support the output of the screen interface for the earphone characteristic setting and signal processing for characteristic setting even when an input signal requesting to activate the earphone characteristic setting is generated from, for example, the input unit 120.

When the earphone 200 is connected to the earphone interface 170, the earphone signal processing unit 165 may recognize the connection with the earphone 200 and perform signal processing to support a function of the earphone 200. Also, the earphone signal processing unit 165 may perform various user function control using the earphone 200 based on the signal transmitted from the earphone signal collection unit 161. For example, the earphone signal processing unit 165 may activate the call connection function or call termination function according to the signal transmitted from the earphone 200 and perform a volume up/down function according to the signal transmitted from the earphone 200. To this end, the earphone signal processing unit 165 may refer to the earphone characteristic setting table 153 stored in the storage unit 150. The earphone signal processing unit 165 compares the signal transmitted from the earphone 200 and the earphone characteristic settings table 153 to control a signal processing in accordance with a corresponding function.

Figure 4:
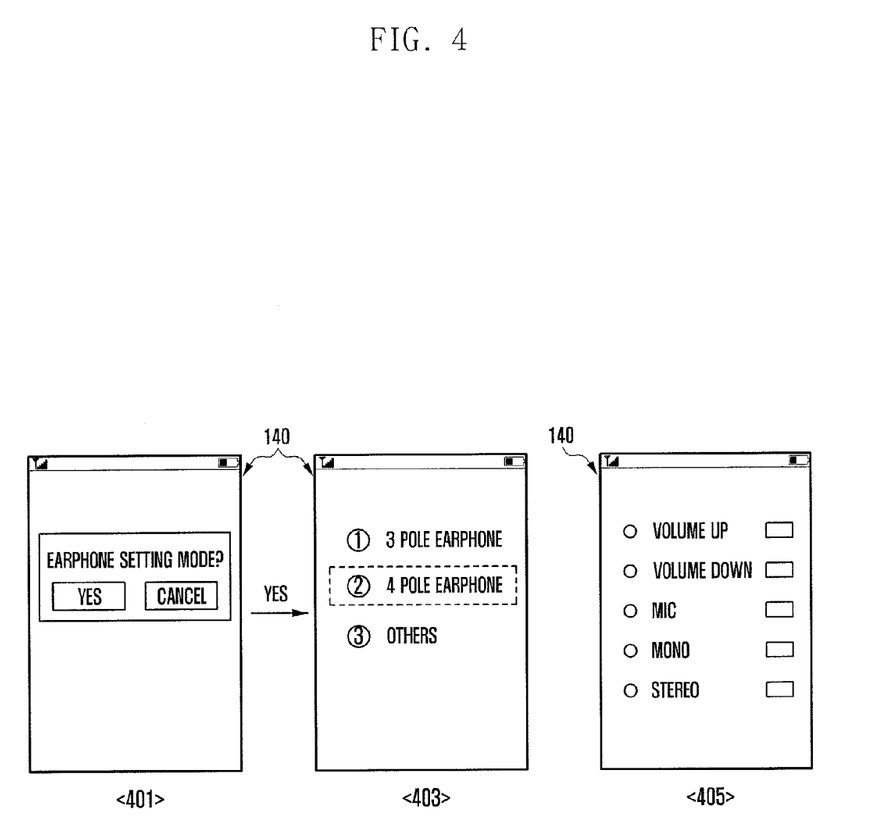
FIG. 4 is a view illustrating an example screen interface for setting a characteristic of an accessory according to an exemplary embodiment of the present invention.

FIG. 4 is a view illustrating an example screen interface for setting a characteristic of an accessory according to an exemplary embodiment of the present invention. In the following description, the screen interface for characteristic setting is described with respect to an earphone. However, it should be noted that elements outputted to the screen interface can be replaced with other accessory capable of connecting to the portable terminal.

The display unit 140 of the portable terminal 100 may output various user function screen according to the user control. Particularly, when an input signal for the earphone characteristic setting is generated from the input unit 120 or a particular input signal transmitted from the earphone 200 is not recognized, the display unit 140 of the present invention may output a setting screen for confirming the earphone characteristic setting. For example, a popup window, as shown in a screen 401, may be displayed to allow a user to confirm the earphone characteristic setting. To this end, the portable terminal 100 may provide a menu for setting the earphone characteristic. In addition, the portable terminal 100 may dispose a hot key for setting the earphone characteristic thereon. The portable terminal 100 may output an earphone setting mode confirmation popup window for setting the earphone characteristic as shown in the screen 401 when the input signal received from the earphone 200 is different from the predefined setting value or out of an acceptable range according to the user setting. In regard to an output of the above described popup window, the portable terminal 100 may compare the earphone characteristic setting table 153 stored in the storage unit 150 with the input signal transmitted from the earphone 200.

In the screen 401, when the user requests the earphone characteristic setting through a confirmation input (e.g., when a user inputs "YES" by selecting the corresponding text box, or by inputting a corresponding key), the display unit 140 may output a setting screen as shown in a screen 403 in which the user may select a type of the earphone 200 inserted to the earphone interface 170. As another example, the portable terminal 100 may determine the type of the earphone 200 inserted to the earphone interface 170 based on a signal change generated in the earphone interface 170 (e.g., a voltage change). When the voltage change, which is generated by an insertion of the earphone 200 to the earphone interface 170 and which has a different value from the predefined value, is collected, the portable terminal 100 may support to enable the user to directly define the earphone 200 connected thereto so that the user can set the earphone characteristic through the screen 403. Accordingly, based on the screen interface 403, the user can directly select the type of the earphone 200 inserted to the earphone interface 170.

In the screen 403, when the type of the earphone 200 is selected, the display unit 140 may output a screen interface as shown in a screen 405 that supports to define various functions that can be performed by the selected earphone 200. For example, when the four pole earphone is selected in the screen 403, the display unit 140, as shown in screen 405, may provide an item for setting "volume up," "volume down," "MIC," "mono," or "stereo." Then the user can activate the key button of the earphone corresponding to an item when the item is provided with a highlight. Accordingly, a voltage signal corresponding to a particular key button of the earphone 200 is transmitted to the controller 160 of the portable terminal 100 through the earphone interface 170. Thus, the display unit 140 may output a setting window including a list of earphone functions to be matched with an input signal generated in the earphone according to the selected type of the earphone 200. The controller 160 determines the voltage signal of a currently selected item as a signal corresponding to a key button of the corresponding earphone 200 and updates the earphone characteristic setting table 153 based thereon. In other words, the controller 160 of the portable terminal 100 may support to set the voltage signal of the key button according to the user setting in the earphone characteristic setting mode. Accordingly, the portable terminal 100 supports to define a respective key for a corresponding key button based on the signal value even when the voltage signal of the key button of a particular earphone 200 provides a value different from the predefined value of the portable terminal 100. As a result, an exemplary embodiment of the present invention is applicable to any type of the portable terminal 100 regardless of the type or characteristic of the earphone 200.

On the other hand, although it is described that screen 401 and the screen 40 are outputted to the display unit 140 prior to an output of the screen 405, exemplary embodiments of the present invention are not limited thereto. For example, according to an earphone characteristic setting environment, the output of the screen 401 and the screen 403 may be omitted, and when the input signal received from the earphone 200 is not recognized by the portable terminal 100, the portable terminal 100 may support to automatically output the screen 405 to the display unit 140. Then the user completes the characteristic setting of the earphone 200 by matching a function of the key buttons provided on the earphone 200 to a function of the earphone 200 supported by the portable terminal based on a corresponding screen, thereby operating the earphone function using the corresponding earphone 200.

In the above, each element of the portable terminal that supports the earphone characteristic setting function according to an exemplary embodiment of the present invention and a role thereof are described. Hereinafter, a method of setting an earphone characteristic for supporting the earphone characteristic setting function described above will be described in detail with reference to the drawing.

Figure 5:
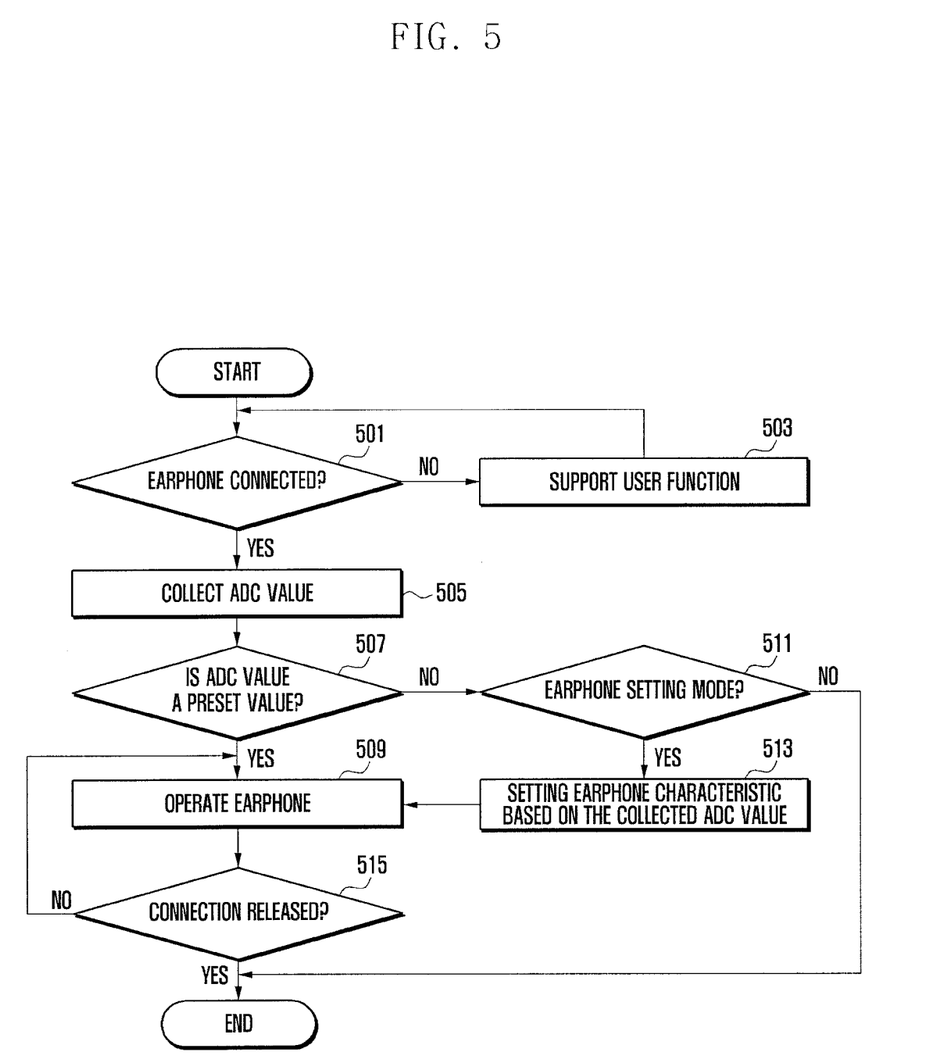
FIG. 5 is a flowchart diagram illustrating a method of setting a characteristic of an accessory according to an exemplary embodiment of the present invention.

FIG. 5 is a flowchart diagram illustrating a method of setting a characteristic of an accessory according to an exemplary embodiment of the present invention.

Referring to FIG. 5, in a method of setting the earphone characteristic according to an exemplary embodiment of the present invention, the controller 160 of the portable terminal 100 may first determine whether the earphone is connected at step 501. To this end, the controller 160 may monitor the earphone interface 170 to determine whether an interrupt is generated according to connection between the earphone interface 170 and the earphone 200. When the earphone 200 is not connected to the earphone interface 170 at step 501, the controller 160 supports the user function of the portable terminal 100 at step 503. Next, when the interrupt is generated according to the connection between the earphone interface 170 and the earphone 200 during supporting the user function, or when the interrupt is generated according to the connection between the earphone interface 170 and the earphone 200 at step 501, the controller 160 collects an Analog Digital Converting (ADC) value transmitted from the earphone at step 505. Here, the ADC value may be a digital conversion value of a signal generated in the earphone 200 connected to the earphone interface 170. For example, the ADC value may be a voltage signal corresponding to the MIC activation key button of a particular earphone 200 or a voltage signal corresponding to the volume up/down key button.

Next, the controller 160 determines whether the collected ADC value is included in the predefined value at step 507. To this end, the controller 160 identifies the earphone characteristic setting table 153 pre-stored in the storage unit 150 and determines whether information corresponding to a currently collected ADC value exists in a corresponding table. Here, when the ADC value is included in the pre-stored earphone characteristic setting table 153, the controller supports an operation of the earphone 200 based on the corresponding table at step 509. Namely, the controller 160 refers to the earphone characteristic setting table 153 to identify a signal characteristic of the currently collected ADV value and supports a corresponding user function such as, for example, a call connection/termination function based on the earphone 200, a volume up/down function based on the earphone 200, a mono or stereo setting function, a video signal external output function, or an audio signal external output function of the earphone 200.

Meanwhile, when the ADV value collected in step 507 is out of a preset range, the controller 160 determines whether an earphone setting mode is supported at step 511. To this end, the controller 160 may support to output a popup window on the display unit 140 to confirm switching to the earphone setting mode. When an input signal for supporting the earphone setting mode is not generated in step 511, (i.e., when the earphone setting is not performed or a corresponding input signal is generated), the method may proceed to a function termination step. When the function is terminated, the method may proceed to step 501 to repeat subsequent steps.

Meanwhile, when the input signal for the earphone setting mode is generated at step 511, the controller 160 may control to update the earphone characteristic setting table 153 based on the collected ADC value at step 513. For example, the controller 160 may control to output the popup window for confirming the earphone characteristic setting in step 511, and when a confirmation input signal for the earphone characteristic setting is generated based on a corresponding popup window, the controller 160 may proceed to step 513 to support the earphone characteristic setting function.

The earphone characteristic setting function may be a function to map the ADC value transmitted from the earphone 200 to a particular key button. Accordingly, the controller 160 may support setting respective function for each input signal generated in the earphone 200 through a process of designating the type of the earphone 200 and designating the ADC value of each key button of the earphone 200, thereby supporting to perform a function of the earphone 200 regardless of the type or characteristic of the earphone 200.

Meanwhile, subsequent to step 509 or step 513, the controller 160 may determine whether connection of the earphone 200 to the earphone interface 170 is released at step 515. When the connection between the earphone 200 and the earphone interface 170 is released, the controller 160 terminates the function. When the connection between the earphone 200 and the earphone interface 170 is maintained, the controller 160 proceeds to step 509 to support the earphone function.

As described above, in a method of setting the earphone characteristic and a portable terminal for supporting the same according to an exemplary embodiment of the present invention, the earphone characteristic of the portable terminal 100 may be set according to a user request so that the earphone may be compatibly operable regardless of the type or characteristic of the earphone.

In addition, in the above description, the accessory characteristic setting function according to an exemplary embodiment of the present invention is described with respect to the earphone. However, exemplary embodiments of the present invention are not limited thereto. Namely, the accessory according to an exemplary embodiment of the present invention my include not only the earphone that may be connected to the portable terminal but also, for example, a TV-out external device that is connected to the portable terminal to output a video signal of the portable terminal, or an audio-out external device that outputs an audio signal of the portable terminal. According to such examples, the storage unit of the portable terminal stores an accessory characteristic setting table corresponding to the TV-out external device or the audio-out external device, and the portable terminal may support to control the setting of an accessory characteristic through an interface similar to the screen interface in FIG. 4 as described above. Also, the earphone interface may be replaced with an accessory connection interface having a connector configuration that can be connected to, for example, the TV-out external device or the audio-out external device described above. If the accessory is the TV-out external device, then the accessory may generate and transmit the input signal for supporting a video signal external output function to the portable terminal. Also, if the accessory is the audio-out external device, then the accessory may generate and transmit the input signal for supporting an audio signal external output function to the portable terminal. Further, the respective accessories may generate and transmit an input signal for video reproducing control and an audio reproducing control to the portable terminal.

Above the earphone interface, TV-out external device, Audio-out external device, or another external device may be operatively attached and accessories in the form of a connector may be replaced by access interface. For example, if the external device includes TV-out accessories, then the accessory may support an external output video signal to be generated and passed to the portable terminal as an input signal. In addition, if the external device includes Audio-out accessories, then the accessory may support an external output audio signal to be generated and passed to the portable terminal as an input signal. In addition, according to exemplary embodiments, each accessory discussed above may support video playback controls, an audio input for playback control signals, or the like to be passed to the portable terminal.

Also, the accessory according to an exemplary embodiment of the present invention may be an apparatus having various configurations in which the accessory is connectable to an accessory interface of the portable terminal. For example, the accessory according to an exemplary embodiment of the present invention may be an apparatus having various forms such as, for example, a holder, a broadcast receiver, or an auxiliary battery that can be connected to the potable terminal to support a particular auxiliary function. Also, although the input signal discussed above which is generated in the accessory is described in connection with the earphone (e.g., a MIC activation input signal, a call connection/termination input signal, or the like), the input signal according to an exemplary embodiment of the present invention may include various input signals corresponding to a function supported by a corresponding accessory if the exemplary embodiment of the present invention applies to a different accessory. As an example, when the input signal of the accessory is changed, a value in the accessory characteristic setting table may be newly set or a previous value may be updated according to the user setting. Thus, although the accessory characteristic setting function is described in connection with the earphone in the above, it should be understood that exemplary embodiments of the present invention are applicable to various accessory apparatuses that can connect to the portable terminal to transmit a signal generated in the portable terminal to an external thereof or to transmit an external signal to the portable terminal.

Meanwhile, the portable terminal 100 described above may further include an additional module according to a form in which it is provided. In other words, if the portable terminal 100 is a communication terminal, then the portable terminal 100 may further include additional elements that have not been described in the above such as, for example, a short-range communication module to enable short-range communication, an interface for data transmission and reception through a wire communication method or through a wireless communication method of the portable terminal, an internet communication module for providing an internet function by communicating with an internet network, a digital broadcast module for receiving and reproducing a digital broadcast data, and/or the like. With the convergence of a digital device, there may be many modifications thereof, which may not be listed above, however, it will be appreciated that an additional element (e.g., similar to the additional elements listed above) may be further included in the portable terminal 100. Also, a person of ordinary skill in the art will appreciate that the portable terminal 100 may be implemented by omitting a particular element or replacing a particular element with other elements according to the form in which it is provided.

Further, the portable terminal 100 according to exemplary embodiments of the present invention may provide any type of a device having the earphone interface. For example, the portable terminal 100 may include all information technology devices, multimedia devices and their associated application devices, such as a Portable Multimedia Player (PMP), a digital broadcasting player, a Personal Digital Assistant (PDA), a music reproducing device (for example, an MP3 player), a mobile game terminal, a smart phone, a laptop computer, a handheld Personal Computer (PC), including all mobile communication terminals operating based on communication protocols corresponding to various communication systems, and/or the like.

As described above, in a method of setting a characteristic of an accessory and an accessory operation system supporting the same according to exemplary embodiments of the present invention, the characteristic of the accessory may be set according to user setting even if a characteristic of an accessory is different, thereby supporting to operate various accessories in a particular portable terminal. Accordingly, exemplary embodiments of the present invention may broaden a user choice in selecting an accessory by users and improve compatibility of the accessory.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An accessory operation system for supporting setting of a characteristic of an accessory, the accessory operation system comprising: an accessory configured to: generate an input signal, and transmit the input signal to a portable terminal in response to a user input on the accessory; and a portable terminal configured to: receive the input signal from the accessory, compare the input signal with a preset setting value, perform an audio function corresponding to the input signal when the input signal is determined to be in a range of the preset setting value based on a comparison result, display a first setting screen for selecting a type of an earphone from two or more types connected to an accessory interface when the input signal is determined to be out of the range of the preset setting value, display a second setting screen for selecting the audio function of the earphone in response to selecting the type of the earphone from the two or more types displayed in the first setting screen, and perform a mapping operation in which the input signal is mapped to the selected audio function in response to selecting the audio function of the earphone displayed in the second setting screen.

2. The accessory operation system according to claim 1, wherein the portable terminal comprises: an accessory connection interface to which the accessory is connected; a storage unit configured to store an accessory characteristic setting table including a function to be performed based on the input signal; and a controller configured to control the accessory characteristic setting table.

3. The accessory operation system according to claim 1, wherein the controller comprises: an accessory signal collection unit configured to collect a signal corresponding to the input signal; an accessory setting support unit configured to support updating of an accessory characteristic setting table; and an accessory signal processing unit configured to support an accessory function based on the signal.

4. The accessory operation system according to claim 3, wherein the accessory setting support unit is configured to compare an Analog Digital Converter (ADC) value transmitted according to an activation of a particular input signal of the accessory with a setting value corresponding to the particular input signal that is pre-stored in the accessory characteristic setting table, and configured to control to automatically output a setting screen for updating the accessory characteristic setting table when it is determined based on a comparison result that the transmitted ADC value is out of the range of a preset value.

5. The accessory operation system according to claim 1, further comprising: a display unit configured to display at least one of: a connection state of the accessory in relation to the accessory interface of the portable terminal, and a condition in which an activated particular input signal generated by the accessory is out of the range of a preset value.

6. The accessory operation system according to claim 5, wherein the display unit is configured to output a setting screen for confirming whether setting of the characteristic of the accessory is desired.

7. The accessory operation system according to claim 1, wherein the accessory comprises: a generator configured to generate an input signal corresponding to a user function supported by the accessory.

8. The accessory operation system according to claim 1, wherein the accessory is an apparatus that is operatively connected to the portable terminal and that generates a certain input signal to support a particular auxiliary function.

9. A method of setting a characteristic of an accessory, the method comprising: connecting the accessory to an accessory interface of a portable terminal; collecting an input signal generated by the connected accessory in response to a user input on the connected accessory; comparing the collected input signal with a preset setting value; performing an audio function corresponding to the collected input signal when the collected input signal is determined to be in a range of the preset setting value based on a comparison result; displaying a first setting screen for selecting a type of an earphone from two or more types connected to the accessory interface when the collected input signal is determined to be out of the range of the preset setting value; displaying a second setting screen for selecting the audio function of the earphone in response to selecting the type of the earphone from the two or more types displayed in the first setting screen; and
performing a mapping operation in which the collected input signal is mapped to the selected audio function in response to selecting the audio function of the earphone displayed in the second setting screen.

10. The method according to claim 9, further comprising: outputting a setting screen for confirming whether setting of the characteristic of the accessory is desired.

11. The method according to claim 9, wherein the comparing comprises: comparing an Analog Digital Converter (ADC) value of the collected input signal with a preset ADC value.

12. The method according to claim 9, further comprising: selecting a menu for setting the characteristic of the accessory or for receiving an input signal corresponding thereto; and performing the mapping operation according to the input signal.

13. The method according to claim 9, further comprising: storing, in a storage unit, an accessory characteristic setting table in which an accessory function item is mapped to an input signal of the accessory; and supporting an accessory function by processing the input signal generated by the accessory based on the accessory characteristic setting table stored in the storage unit.

14. The method according to claim 9, wherein the collecting of the input signal comprises: collecting at least one of various input signals for supporting a function of the accessory including, a microphone (MIC) activation input signal of the accessory;
a volume up/down input signal of the accessory; a call connection/termination input signal of the accessory; a video signal external output input signal; an audio signal external output input signal; a video reproducing control input signal; and an audio signal reproducing control input signal.

15. A non-transitory computer-readable storage medium storing a program for setting a characteristic of an accessory, comprising instructions to cause a processor to: collect, in response to a user input on an accessory that is connected to a portable terminal, an input signal generated by the accessory; compare the collected input signal with a preset setting value; perform an audio function corresponding to the collected input signal when the collected input signal is determined to be in a range of the preset setting value based on a comparison result; display a first setting screen for selecting a type of an earphone from two or more types connected to an accessory interface when the collected input signal is determined to be out of the range of the preset setting value; display a second setting screen for selecting the audio function of the earphone in response to selecting the type of the earphone from the two or more types displayed in the first setting screen; and perform a mapping operation in which the collected input signal is mapped to the selected audio function in response to selecting the audio function of the earphone displayed in the second setting screen.

16. The non-transitory computer-readable storage medium of claim 15, further comprising instructions to cause a processor to: output to a display unit a setting screen for confirming whether setting of the characteristic of the accessory is desired.

17. The non-transitory computer-readable storage medium of claim 15, further comprising instructions to cause a processor to: store an accessory characteristic setting table in which an accessory function item is mapped to an input signal of the accessory; and support an accessory function by processing the input signal generated by the accessory based on the accessory characteristic setting table stored in the storage unit.

18. A portable terminal comprising: a controller configured to: receive an input signal from the accessory, compare the input signal with a preset setting value, perform an audio function corresponding to the input signal when the input signal is determined to be in a range of the preset setting value based on a comparison result, display a first setting screen for selecting a type of an earphone from two or more types connected to an accessory interface when the input signal is determined to be out of the range of the preset setting value, display a second setting screen for selecting an audio function of the earphone in response to selecting the type of the earphone from the two or more types displayed in the first setting screen, and perform a mapping operation in which the input signal is mapped to the selected audio function in response to selecting the audio function of the earphone displayed in the second setting screen.

19. A method of setting a characteristic of an accessory, the method comprising: receiving an input signal from the accessory; comparing the input signal with a preset setting value; performing an audio function corresponding to the input signal when the input signal is determined to be in a range of the preset setting value based on a comparison result; displaying a first setting screen for selecting a type of an earphone from two or more types connected to an accessory interface when the input signal is determined to be out of the range of the preset setting value, displaying a second setting screen for selecting an audio function of the earphone in response to selecting the type of the earphone from the two or more types displayed in the first setting screen, and performing a mapping operation in which the input signal is mapped to the selected audio function in response to selecting the audio function of the earphone displayed in the second setting screen.

\* \* \* \* \*